(12) United States Patent
Vadstrup

(10) Patent No.: US 8,513,529 B2
(45) Date of Patent: Aug. 20, 2013

(54) ARRANGEMENT AND METHOD FOR INSTALLING CABLES

(75) Inventor: Esben Vadstrup, Skørping (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/454,430

(22) Filed: Apr. 24, 2012

(65) Prior Publication Data

US 2012/0272519 A1 Nov. 1, 2012

(30) Foreign Application Priority Data

Apr. 27, 2011 (EP) .................................... 11163910

(51) Int. Cl.
| | |
|---|---|
| *H01B 7/00* | (2006.01) |
| *H01B 7/06* | (2006.01) |
| *H01B 7/24* | (2006.01) |
| *H02G 7/08* | (2006.01) |
| *H02G 15/02* | (2006.01) |
| *H02G 3/00* | (2006.01) |
| *B23P 19/00* | (2006.01) |

(52) U.S. Cl.
USPC ........... 174/135; 174/40 CC; 174/69; 174/79; 174/100; 174/136; 29/745

(58) Field of Classification Search
USPC ................... 174/69, 79, 92, 100, 102 E, 136, 174/40 CC, 135; 29/745
See application file for complete search history.

(56) References Cited

U.S. PATENT DOCUMENTS

| 1,424,115 | A | * | 7/1922 | Nileon | 182/198 |
|---|---|---|---|---|---|
| 1,818,602 | A | * | 8/1931 | Bowly | 248/49 |
| 4,625,936 | A | * | 12/1986 | Hadden, Sr. | 248/544 |
| 2004/0094965 | A1 | * | 5/2004 | Kirkegaard et al. | 290/55 |
| 2004/0235619 | A1 | * | 11/2004 | Stoltz | 482/24 |
| 2006/0151763 | A1 | * | 7/2006 | Crawford | 254/264 |
| 2008/0289904 | A1 | * | 11/2008 | Heiduk | 182/196 |
| 2009/0206610 | A1 | * | 8/2009 | Martin et al. | 290/55 |
| 2010/0006710 | A1 | * | 1/2010 | Lyness et al. | 248/70 |
| 2011/0061314 | A1 |   | 3/2011 | Muehlhaeuser | |

FOREIGN PATENT DOCUMENTS

| DE | 20006674 U1 | 10/2000 |
|---|---|---|
| JP | 3239112 A | 10/1991 |
| WO | WO 2004072474 A1 | 8/2004 |

OTHER PUBLICATIONS

Communication From European Patent Office, Sep. 26, 2011, pp. 1-4.

* cited by examiner

*Primary Examiner* — Timothy Thompson
*Assistant Examiner* — Sherman Ng

(57) ABSTRACT

At least one cable is fastened to a longitudinal structure. The longitudinal structure is prepared to absorb the tensile load of the cable. The longitudinal structure is prepared to be bent together with the cable around an obstacle of a construction while they are positioned in reference to the construction.

16 Claims, 2 Drawing Sheets

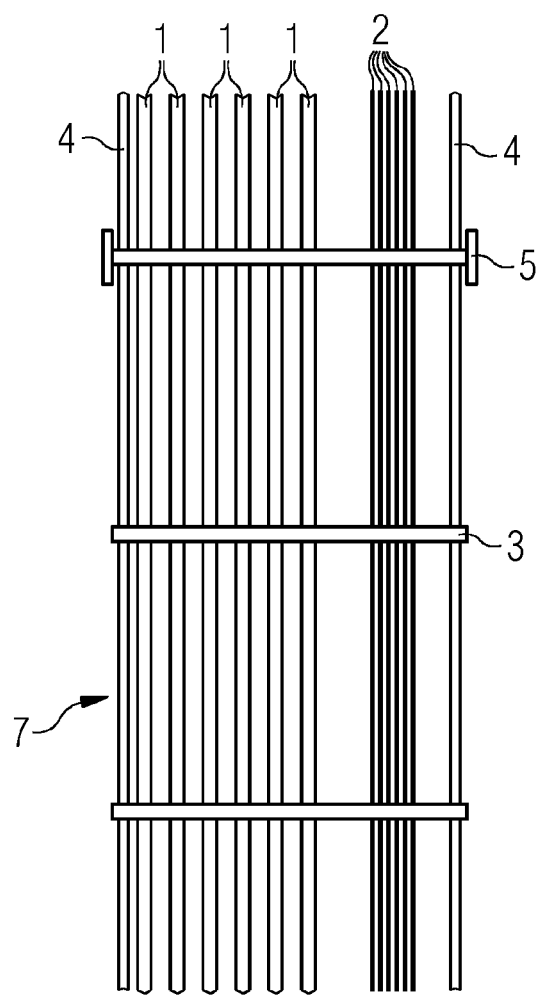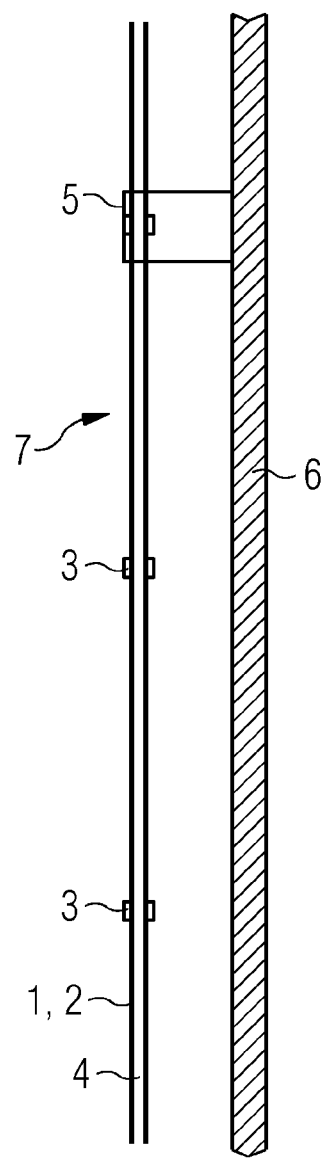

FIG 3
FIG 4
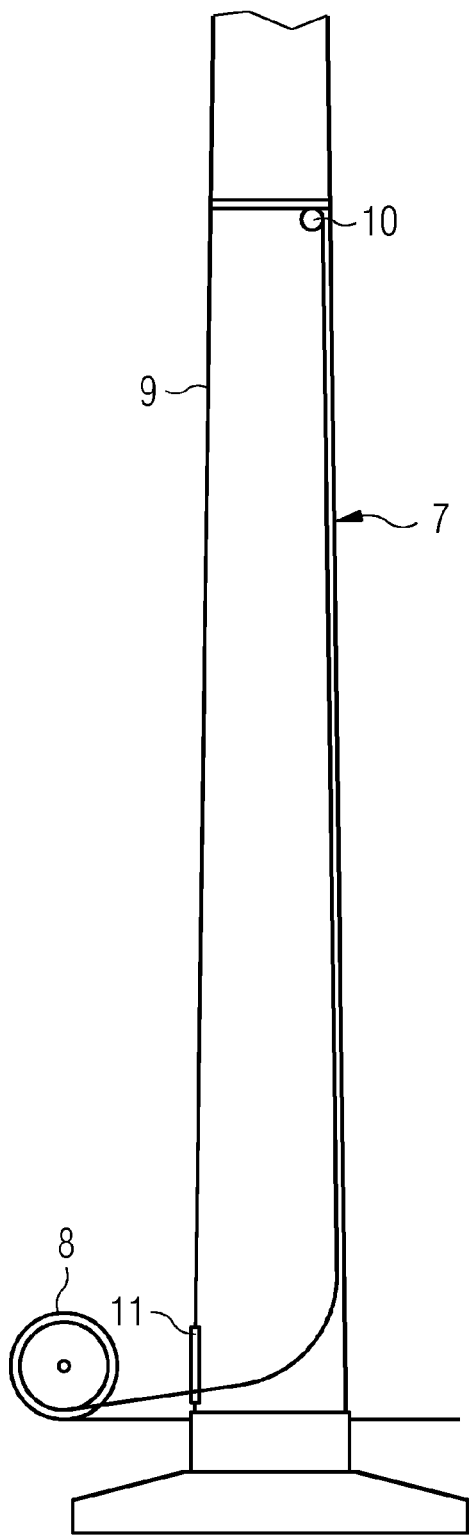
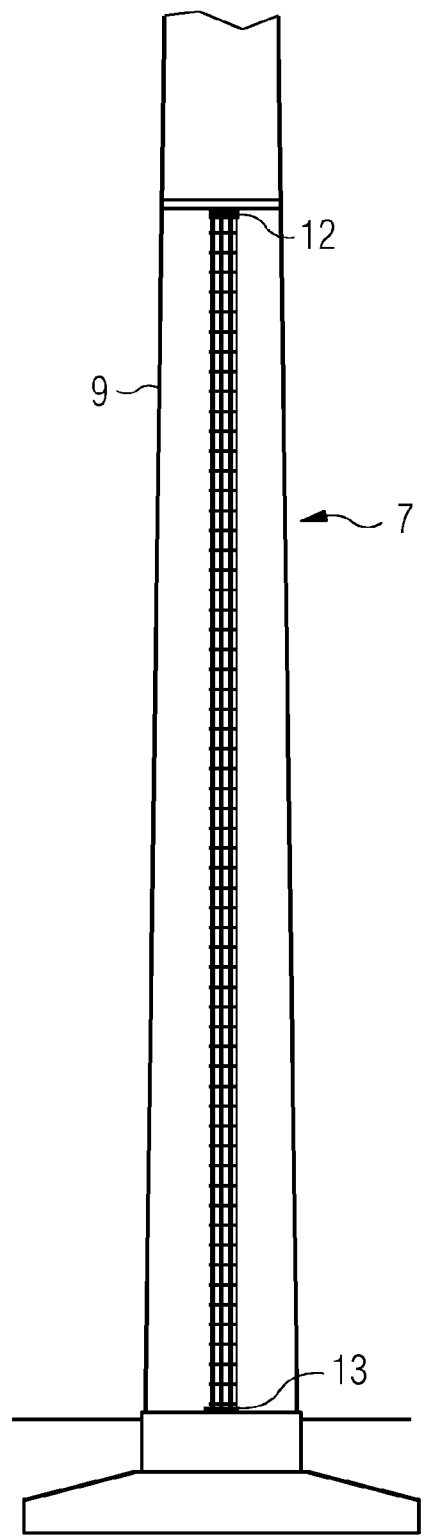

ARRANGEMENT AND METHOD FOR INSTALLING CABLES

CROSS REFERENCE TO RELATED APPLICATIONS

This application claims priority of European Patent Office application No. 11163910.0 EP filed Apr. 27, 2011. All of the applications are incorporated by reference herein in their entirety.

FIELD OF INVENTION

An arrangement for installing cables and a method to install cables fastened to the arrangement are described.

BACKGROUND OF INVENTION

Cables for different applications are installed in constructions with a long expansion, like shafts, tunnels, ducts, pylons or wind turbine towers. The cables are leading from one end to the other end of the construction, e.g. from a nacelle of a wind turbine to the base of the wind-turbine-tower.

The cables are used for the transmission of electrical energy or for data transmission, e.g. for the transmission of measurement values or for the transmission of control or regulation signals. The cables are copper- or aluminum-cables or fiber optic cables or the like.

Different methods are known to install cables into such constructions.

It is known to fasten cables with cable clamps. The cable clamps are arranged on traverse support bars preferably. The support bars are mounted to the construction wall or to a suitable constructive structure in the construction.

The support bars are connected in more or less equal distances to each other with the construction along the longitudinal extension of the construction.

Even cable ladders or cable trays may be used for this purpose.

The support bars, cable ladders, cable trays or the like are connected with the construction after the construction is erected or built.

SUMMARY OF INVENTION

During installation single cables or bundles of cables are brought into a wind turbine tower for example through an opening of the tower. They are pulled up into the tower by the help of a hoist gear or the like.

Thereafter each single cables needs to be fastened along its length, thus the mounting is time expensive.

The cable has to carry its own weight when it is pulled up into the tower. There is the need to avoid cable damages during the installation work if the cable is long and if it hangs free over a certain distance during the work. Thus the total free length of the cable is limited.

The cable or cables are fastened one by one or in groups to a support structure inside the tower. The cables are fastened in certain places to avoid interferences.

The cables are fastened with fastening means, e.g. by the use of cable clamps or cable strips. They need to be positioned between every 25 cm to 50 cm, thus a lot of expensive installation material is needed. Additionally a lot of installation time is needed to mount the cables and the installation material.

The fastening-work has to be done along the whole length of the tower in different heights. Thus the work is dangerous for the workers.

Provided are an improved arrangement and an improved method for cable-installation, which allows the fastening work to be more cost and time effective and to be more save. Embodiments are provided by the dependent claims.

At least one cable is fastened to a longitudinal structure. The longitudinal structure is prepared to absorb the tensile load of the cable. The longitudinal structure is prepared to be bent together with the cable around an obstacle of a construction while they are positioned in reference to the construction.

The concepts described herein relate to every construction like towers, tunnels, wind turbines, shafts, ducts, pylons, etc. For illustrative purposes only, various embodiments described herein are in regards to a wind turbine and are not to limit the scope of the claims.

The longitudinal structure is capable of taking the tensile load of at least one cable, which is fastened to it. At the same time the longitudinal structure is pliable. Thus the arrangement may be brought into the construction after a cable is fastened to the longitudinal structure. It is possible to curve the arrangement around a bend if needed.

The arrangement may be fastened in the construction, near the upper end of a tower for example. Thus the arrangement is fixed to the construction while the arrangement takes the tensile load of the cable.

The at least one cable and the longitudinal structure are prepared and arranged in a way that they are curved with nearly the same bending-radius if needed.

Thus no movement-compensation between the cable and the longitudinal structure is needed.

A wire rope may be used as longitudinal structure. Thus the wire rope takes the self-weight of a cable while the structure of the wire rope allows the bending movement.

The longitudinal structure may be a rope ladder. Thus the whole stability of the arrangement is improved. The constructive width of the arrangement may be varied in dependency to the number of cables needed.

The cable may be connected with a rung of the ladder or with a holm of the ladder by help of cable clamps or cable strips. This allows personnel to climb and secure themselves to the ladder while working.

The fastening-means may be a part of a support-structure. The support-structure is prepared to connect the cable with the longitudinal structure. The support-structure is prepared to connect the longitudinal structure with the construction.

The arrangement may contain an additional bracket or fastener for the fixation of the longitudinal structure to the construction, for example to a wall. Thus vibrations or a free movement of the arrangement is avoided.

The longitudinal structure is fastened to the construction after the cable was hoisted up to the upper end of the tower. Thus the longitudinal structure carries the weight of the cables, which are attached to the longitudinal structure.

The arrangement is fixed to a certain predetermined point inside the construction, i.e. at a tower wall, and if needed at one or two locations along its longitudinal extension. Thus unwanted vibrations or movements of the longitudinal structure with the cables attached to it are avoided.

Just a few points of attachment are needed to fasten the arrangement. Thus installation time is reduced. Even the amount of installation material is reduced.

The longitudinal structure and the cable may be arranged as loop or circle or semi-circle to compensate movements of the construction, e.g. a rotational movement or a thermal extension.

The loop may be arranged in or close to the top of the nacelle of a wind turbine. Thus the loop allows the movement or yawing of the nacelle despite the connected cables therein. The cables are not damaged while the arrangement carries the weight of the cables to relief stress on the cables.

The arrangement may be used to mount cables in a wind turbine tower.

The cables may be fastened to the longitudinal structure before the whole arrangement is positioned in the construction, i.e. the wind turbine tower.

The fastening of the cables to the longitudinal structure may be done on ground level. Thus the work may be done safer, quicker and cheaper compared to the prior art.

The cables may be fastened to the longitudinal structure close to the base-area of the tower. Thus work in potentially dangerous height is avoided.

The cables may be fastened to the longitudinal structure outside the tower. Thus the work of fastening the cables is not limited the limited space of the tower.

The cables may be fastened to the longitudinal structure off-site, i.e. at a factory. The whole arrangement is delivered to the wind turbine site as pre-mounted arrangement. Thus installation time on site is reduced.

The whole arrangement may be rolled up on a cable drum. The longitudinal structure and the cables fastened to it are pulled through an opening, like a doorway, and mainly horizontally into the tower.

The longitudinal structure and the connected cables are hoisted up inside the tower, mainly vertically. The longitudinal structure and the cable are thus capable of being curved continuously around a bend or any other obstacle, while they are hoisted up.

The arrangement may be installed in a tunnel or the like. Its components are brought—as described above—into the tunnel through an opening. The arrangement is pulled along the inside of the tunnel, i.e. horizontally, while the longitudinal structure and the cable are capable of being curved continuously around existing bends or other obstacles.

The arrangement may be fastened every 50 cm along its longitudinal direction. The spacing may vary from 50 cm up to 3 m.

The longitudinal structure may be fastened near to its ends to the construction (wall).

The longitudinal structure may be mounted with a certain tension in its longitudinal direction. Thus a transverse or lateral movement of the longitudinal structure is limited.

The longitudinal structure is capable of supporting the tensile load of at least one cable that is fastened to it, so the longitudinal structure is relieving the cable of its self-weight during the installation of the arrangement.

The cables may be fastened to the longitudinal structure in multiple points, for example in distances of 25 cm up to 50 cm along the cable.

The installation of cable trays or the like in the tower, leading along the tower wall and over the flanges of the tower walls may not be needed thereby minimizing time and installation costs. As the installation work is even minimized the risk of work in dangerous heights is reduced.

The arrangement may be pulled up into the tower in one step. This saves construction time, which leads to lower costs for the installation.

BRIEF DESCRIPTION OF THE DRAWINGS

Aspects of the invention are shown in more detail by help of figures.

FIG. 1 illustrates several cables leading alongside each other in a vertical direction.
FIG. 2 illustrates a sideward view of the arrangement shown in FIG. 1.
FIG. 3 illustrates the arrangement during an installation.
FIG. 4 illustrates the arrangement after the installation,

DETAILED DESCRIPTION OF INVENTION

FIG. 1 shows several cables leading alongside each other in a vertical direction. The cables are cables for electrical power 1 and other cables 2 e.g. for data communication. The cables are fastened to support structures 3 in a regular distance which may vary e.g. between 25 cm and 50 cm.

The support bars are mounted to a wire rope 4 that leads from one support bar to the next, so that the support bars are connected via that wire rope.

At one of the support bars there is a bracket or strap 5 that is used for a horizontal fixation inside the construction, e.g. to the tower wall inside a wind turbine tower.

FIG. 2 shows a sideward view of the arrangement shown in FIG. 1. FIG. 2 shows the cables 1,2 that are fastened to the support structure 3 and the wire rope 4 that connects the support structure. The wall of a tower 6 is shown next to the arrangement. At one of the support structures there is a bracket or strap 5 as means for a connection between the arrangement and the wall of a wind turbine tower.

FIG. 3 shows the situation during installation of the arrangement 7. The cables are pre-mounted to the longitudinal structure and the arrangement is then stored on a cable drum 8. The figure shows the cable drum outside of the tower 9. The cables with the arrangement is guided into the tower through a doorway, it is curved around a bend at the bottom of the tower and is leading up inside the tower to the top where a pulley 10 is shown, which assists in pulling up the arrangement 7 inside the tower. When the longitudinal structure is pulled up into the tower, the arrangement unwinds from the cable drum, is pulled through the doorway 11, is curved around a bend and pulled up inside the tower, where the longitudinal structure supports the self-weight of the cables. The arrangement is then fastened to the wall of the tower at some points along its longitudinal direction with the help of the brackets or straps.

FIG. 4 shows the final situation, where the arrangement 7 is installed inside the tower. The cables lead mainly vertically inside the tower from the bottom to the top and they are connected to e.g. the nacelle in the top 12 and to e.g. the power unit, transformer unit or the grid in the bottom 13.

The invention claimed is:

1. An arrangement for cable-installation,
    wherein at least one cable is fastened to a longitudinal structure,
    wherein the longitudinal structure is configured to absorb the tensile load of the cable,
    wherein that the longitudinal structure is flexible at least to the extent that it bends together with the cable around an obstacle of a construction during a positioning in reference to the construction,
    wherein the longitudinal structure is a rope ladder, and
    wherein the cable is connected with a rung of the ladder or with a holm of the ladder.

2. The arrangement according to claim 1,
    wherein the longitudinal structure comprises a fastener to connect the cable with the longitudinal structure.

3. The arrangement according to claim 1,
    wherein the longitudinal structure comprises a fastener to connect the longitudinal structure with the construction.

4. The arrangement according to claim 2,
wherein the fastener is selected from the group consisting of clamps, strips, cable-fasteners, ropes, straps and brackets.
5. The arrangement according to claim 3,
wherein the fastener is selected from the group consisting of clamps, strips, cable-fasteners, ropes, straps and brackets.
6. The arrangement according to claim 1,
wherein the longitudinal structure is a wire rope.
7. The arrangement according to claim 2,
wherein the fastener is a part of a support-structure,
wherein the support-structure is configured to connect the cable with the longitudinal structure, and
wherein the support-structure is configured to connect the longitudinal structure with the construction.
8. The arrangement according to claim 7,
wherein the fastener is an integrated part of the support-structure.
9. The arrangement according to claim 2,
wherein the fastener is a part of a support-structure,
wherein the support-structure is configured to connect the cable with the longitudinal structure, or
wherein the support-structure is configured to connect the longitudinal structure with the construction.
10. The arrangement according to claim 9,
wherein the fastener is an integrated part of the support-structure.
11. The arrangement according to claim 1,
wherein the longitudinal structure and the cable are arranged as loop or circle or semi-circle to compensate movements of the construction.
12. The arrangement according to claim 1,
wherein the construction is selected from the group consisting of a tower, a tunnel a pylon and a shaft.
13. The arrangement according to claim 1,
wherein the construction is a wind turbine tower.
14. The arrangement according to claim 1,
wherein the longitudinal structure and the cable are positioned at an inner wall of the construction.
15. The arrangement according to claim 1,
wherein the longitudinal structure and the cable are positioned at an outer wall of the construction.
16. A method for the installation of a cable, comprising:
providing at least one cable fastened to a longitudinal structure, which is a rope ladder configured to absorb the tensile load of the cable;
connecting the at least one cable with a rung of the ladder or with a holm of the ladder; and
positioning the at least one cable fastened to the rope ladder, wherein the rope ladder bends together with the cable around an obstacle of a construction during the positioning.

* * * * *